United States Patent Office 2,823,134
Patented Feb. 11, 1958

2,823,134

DENSIFYING MAGNESIA

Leon M. Atlas, Chicago, Ill., assignor to Armour Research Foundation of Illinois Institute of Technology, Chicago, Ill., a corporation of Illinois No Drawing. Application February 18, 1955
Serial No. 489,260

18 Claims. (Cl. 106—58)

The present invention relates to a method of forming crystalline magnesia, or periclase, of high purity and high density, and more particularly, to an improved method of forming high-purity and high-density periclase by the use of a unique catalytic material.

For a number of years, the problem of densifying magnesia has been recognized, because of the very high temperature (i. e. about 2800° centigrade) which is required to electrically fuse magnesia for purposes of densifying the same and decreasing the effective surface. Various ingredients have been added heretofore allegedly to "catalyze" the desired crystallization at lower temperatures, but the main difficulty here encountered has been that of adding additional impurities to the magnesia by virtue of the presence of the so-called catalyst. In general, two principles have been followed commercially. One involves the use of an additive which serves to combine chemically with the magnesia, such as in the case of silica, chromia and ferric oxide. Another involves the use of a compound which serves to lower the melting point of magnesia when admixed thereto, such as calcium oxide. In each case, substantial quantities of an additional ingredient or impurity must be added to the magnesia and chemical resistance as well as thermal resistance are ordinarily reduced.

Relatively large amounts of these catalyzing ingredients must be used in order to obtain relatively good crystallization at lower practical operating temperatures, perhaps, within the range of 1550° C. to 1800° C., and the presence of such relatively large amounts of impurities in the final periclase product is objectionable for many purposes.

The instant invention is particularly applicable to high-grade or high-purity crystalline magnesia which contains at least 95% MgO and less than about 2% CaO and less than about 2% $SiO_2$ (other impurities being present essentially in trace quantities). In fact, the instant invention is unique in that it is capable of producing densified magnesa or periclase having purity within the limits just indicated.

The instant invention is based upon a discovery that lithium compounds have unique catalytic properties in connection with the densification of magnesia. Such lithium compounds may be used in extremely small quantities to accomplish excellent crystallization and, in certain instances, the lithium compounds demonstrate their truly catalytic character by carrying out their desired function and then substantially disappearing. It has been found that certain preferred lithium compounds perform as a true catalyst, actually assisting the crystallization of the magnesia, while apparently undergoing little or no chemical reaction or "fluxing" therewith.

It is therefore an important object of the instant invention to provide an improved method of densifying magnesia and an improved densified high-purity periclase product.

Another object of the instant invention is to provide an improved process for densifying magnesia, which comprises intimately admixing a finely divided magnesium compound which yields periclase upon firing and a lithium compound, said lithium compund being added in an amount sufficient to provide up to 5 equivalent percent of the lithium compound in the mixture on a dry basis, and firing said mixture to form high-purity periclase; and an improved high-purity periclase product resulting therefrom.

It is still another object of the instant invention to provide an improved method of densifying magnesia by the admixture of minute amounts of a lithium compound therewith and firing at lower temperatures than those presently used commercially.

Other objects, features and advantages of the present invention will become apparent to those skilled in the art from the following detailed disclosure thereof.

My invention consists in a process for densifying magnesia, which comprises intimately admixing a finely divded magnesium compound which yields periclase upon firing and a lithium compound, said lithium compound being added in an amount sufficient to provide up to 5 equivalent percent of the lithium compound in the mixture on a dry basis, and firing said mixture to form high-purity periclase; and a densified high-purity periclase produced by such process consisting essentially of at least 95% MgO, less than 2% CaO, less than 2% $SiO_2$ and less than 1% of a lithium compound in solid solution in the MgO, said periclase having a density of 3.0 to 3.5 and being at least twice as resistant to hydration as pure periclase fired at 1650° C. and somewhat more resistant than electrically fused high-purity periclase. Commercial periclases of densities as low as 2.4 may also be prepared using the invention.

A principal characteristic of the magnesium compound used in the practice of the instant invention is that this compound yields periclase upon firing (with or without various other impurities and additives), although the firing temperature required to obtain densified magnesia or periclase from the instant magnesium compound (in the absence of the lithium compound) is not particularly critical. The addition of the lithium compound serves to catalyze the periclase formation and permit such formation at unusually low firing temperatures. Since the higher the MgO content in the magnesium compound, the more difficult it is to densify the same, the instant invention is used most advantageously with relatively high-purity magnesia or magnesium compounds having a relatively high MgO content of at least about 90%. As used herein, the terms "parts" and "percent" mean parts and percent by weight, unless otherwise designated. The instant invention is, of course, used most advantageously with extremely high-purity (i. e., about 99% MgO) magnesia; but the superior results of the instant invention afford a number of practical advantages using commercial grade substantially pure magnesia, containing at least about 94–95% MgO, not more than about 2% CaO, not more than about 2% $SiO_2$ and traces or less than about 1% $Al_2O_3$ (which latter ingredient is not always found in more than trace quantities).

The amounts of the lithium compound used in the practice of the instant invention are preferably computed on the basis of the "equivalent" percent of the lithium compound. The equivalent percent of the lithium compound in the combination or mixture of magnesium compound and lithium compound is computed as the mol percent of the lithium compound in the mixture multiplied by the number of lithium atoms in the molecule. Thus in a mixture of 100 parts magnesia and 1 part lithium chloride, mols are as follows (assuming completely pure magnesia):

MgO: $\dfrac{100}{\text{MgO mol. wt.}} = \dfrac{100}{40} = 2.5$ mols

LiCl: $\dfrac{1}{\text{LiCl mol. wt.}} = \dfrac{1}{42.5} = 0.0235$ mol

The total mols are $2.5 + 0.0235 = 2.5235$; and the mol percent of lithium chloride is $$\dfrac{0.0235}{2.5235} = 0.94 \text{ mol \% LiCl}$$

Since LiCl has only one Li atom in the molecule the equivalent percent is the same as the mol percent; but if in a mixture of magnesia and lithium sulfate, the $Li_2SO_4$ mol percent is 0.94, for example, then the equivalent percent of lithium sulfate is twice the mol percent or 1.88 because there are two Li atoms in the molecular formula for lithium sulfate. This type of computation makes a direct comparison on the basis of the ratio of Li atoms to MgO molecules no matter what the molecular weight of the lithium compound may be.

The amount of lithium compound used may vary from little more than a trace, for example, as low as 0.01 equivalent percent to a maximum practical amount of up to about 5 equivalent percent. Preferably, the amount used is from about 0.05 to about 1.5 equivalent percent, and most preferably about 0.5 (or 0.25–0.75) equivalent percent, particularly in the case of the chloride. These percentages are, of course, on a dry basis and are computed disregarding volatile materials such as water which may be present initially but which are lost substantially before firing temperatures are reached.

It will be appreciated that lithium compounds which have a relatively high weight percent of lithium are preferred for use in the instant invention, because the anion portion of the lithium compound (assuming it to be a salt) would ordinarily serve as an added impurity. As will be explained hereinafter, however, any lithium compound can be used to obtain the advantageous function here involved, because the key to this function is the presence of the lithium atom or ion in the magnesia mixture at the time of firing. In general, the lithium content of the lithium compound used should be at least about 1% as a practical matter so as to avoid the necessity of adding a substantial amount of "non-lithium" component to the system. The maximum amount of lithium content in the lithium compound is primarily a practical consideration, since the more lithium present therein, the less "non-lithium" component which is to be added. It should also be appreciated that the firing of the magnesia to form the instant high-purity periclase involves firing the mixture of lithium compound and magnesium compound, so the firing involves the firing of the magnesium compound in the presence of the lithium compound. For this reason, highly volatile lithium compounds are not usually practical as starting materials, since it would be necessary to confine the magnesia to a closed atmosphere preventing the escape of the volatile lithium compound during the firing operation, in order to carry out the firing of the magnesium compound in the presence of the lithium compound. Slowly volatilizable lithium compounds (at temperatures approaching the firing temperatures) may be used, however, because certain losses of the lithium compound can be tolerated in view of the effectiveness of even minute amounts of the lithium compound in periclase formation. The same is true of lithium compounds which are thermally decomposible under the process condition. For example, lithium iodide may be used to appreciable advantage in the practice of the instant invention, although (it tends to decompose to $Li_2O$ and I at about 500° C. and) it is not as effective as related compounds such as lithium chloride and lithium bromide which do not tend to volatilize until a temperature of approximately 1300° C. has been reached, at which temperature effective sintering or densification is carried out.

One of the explanations for the superior results obtained using lithium compounds having boiling points in the region of the preferred sintering temperature (i. e., 1200° to 1400° C. and most preferably about 1300°–1400° C. is that the lithium compound having such properties is capable of serving in an extremely effective manner to assist in the densifying reaction and then volatilizes or is otherwise forced back out of the magnesia structure so as to leave only trace quantities of the lithium compound in the densified periclase. One of the aspects of the instant invention resides in an improvement in this process by carrying out the process of the instant invention using lithium compounds having boiling points in the region of the sintering temperature or firing temperature so as to obtain the results just described.

Another aspect of the instant invention resides in the discovery that the manner of admixing the lithium compound and the magnesium compound is of substantial importance. It is true that improved results can be obtained merely by admixing the lithium compound and magnesium compound, both in a finely divided state, using an ordinary dry mixing process. It is believed that the lithium compound acts upon the magnesium compound at the surface thereof, so as to activate the surface, whereby the effective surface is decreased during periclase formation; and on the basis of this belief, it has been found that it is preferably to deposit the lithium compound onto the finely divided magnesium compound so as to coat the surface of the finely divided magnesium compound. Preferably, the lithium compound is deposited from solution, either by precipitation from solution onto the magnesium compound or by the application of a solution of the lithium compound to the surface of the magnesium compound, followed by drying. It has also been found that the coating of the surface of the finely divided magnesium compound usually serves to assist in the subsequent compacting step which is preferably carried out. In the case of certain compounds such as lithium fluoride which are not water-soluble (and which are not soluble in a solvent which could be used commercially as a practical matter in the instant procedure) it has been found advantageous to precipitate the lithium compound onto the surface of the magnesium compound from aqueous solution, for example. As an example, a solution of lithium chloride in water may be applied to the magnesium compound to form a slurry and ammonium fluoride ($NH_4 \cdot HF_2$) may be added so as to precipitate some or all of the lithium in form of lithium fluoride. Lithium fluoride is itself particularly active in the function here involved, but the precipitation method does not appear to apply as active a lithium compound film or coating as can be applied merely by applying an aqueous solution of, for example, lithium chloride to the magnesium compound and then drying the mixture to effect deposition of the lithium chloride onto the magnesium compound. For this reason, water-soluble lithium compounds are preferred for use in the practice of the instant invention.

If for certain industrial purposes, however, it is not desired to apply the lithium compound to the magnesium compound in aqueous slurry, then lithium fluoride is preferred for use in the practice of the invention.

Still another important aspect of the instant invention resides in the use of certain lithium compounds which have been found to greatly improve the compacting properties of the resulting magnesium compound. In one of the usual commercial procedures, the magnesium compound in an aqueous slurry is dried and then compacted in the form of briquettes before firing to complete the final densification. It has been found in the practice of the instant invention that periclase of very high density is obtained carrying out such process if the lithium compound used is a salt of lithium and a polarizable anion.

Polarizable anions are known in crystal chemistry and related fields and particularly good examples of polarizable anions are the chloride and bromide anions. In the practice of the instant invention, it has been found that unusually good results are obtained using any lithium halide, but the best results are obtained using the two intermediate molecular weight halides, namely, lithium chloride and lithium bromide.

Although it is not desired to limit the instant invention to any particular theory, certain conclusions have been arrived at as a result of the unusual results obtained using lithium compounds generally and the still better results obtained using certain specific lithium compounds and/or certain specific procedures; and it is believed that these conclusions are supported by sound theoretical considerations. The thermal transformation of an aggregate of fluffy, active MgO to a dense body of crystalline periclase proceeds through a combination of various forms of material flow and recrystallization. The driving forces responsible for both of these processes include the tendency to minimize the surface and defect energy of the MgO particles and to relieve the stresses at the points of contact between the grains. In order for these driving forces to operate effectively to produce densification, it appears that two conditions should be maximized. First, the individual MgO particles should be in the closest possible contact before (and during) thermal treatment or firing. Secondly, sufficient thermal energy should be provided to activate the structure so that the various glide mechanisms and ionic diffusion can proceed rapidly. In the case of pure MgO, the attainment of both of these conditions is difficult. Close contact between the particles is resisted by electrostatic repulsive forces generated by the localization of negative charges on the distorted surfaces of the MgO crystals. Furthermore, these pure MgO crystals have a very high lattice energy with the result that the minimum effective activating temperatures are of the order of 1500–1600° C.

A key to the instant invention is believed to be based upon the fact that the ionic sizes or dimensions of magnesium and lithium are substantially the same. This permits the substitution of a lithium atom or ion for a magnesium atom or ion in the magnesia crystal lattice. The lithium ions have about the same radius as the magnesium ions but only half the ionic potential. It appears that the presence of a foreign ion, such as the lithium ion, serves to lower or decrease the lattice energy of the refractory oxide (MgO) structure, because of the lower ionic potential of the lithium ion. It will be appreciated that the lithium compound undergoes fusion substantially prior to the temperature at which magnesia undergoes fusion (and substantially prior to the instant firing temperature) so that the lithium ions are mobile at a relatively low temperature and may enter into the magnesia lattice at least at the surface. This results in a decrease in the lattice energy which permits the various densification mechanisms and phenomena to take place much more readily than in the case of pure MgO.

With respect to the first desired condition of obtaining better compacting, or the closest possible contact between the MgO particles before thermal treatment, the electrostatic repulsive forces on the surfaces of the MgO crystals tend to resist such compacting. This is presumably caused by a net negative electrostatic charge on the surface of the simple MgO particles. It has now been found that, by the use of a lithium compound (having a cation, lithium, which has approximately the same size as the magnesium cation) which is a lithium salt of a polarizable anion, this charge effect on the magnesia particles can be greatly decreased. The treatment of the surfaces of the finely divided magnesia particles by a solution of a lithium salt formed with a polarizable anion, such as lithium chloride or lithium bromide or lithium iodide has been found to greatly improve the compactibility of the magnesia particles; and it has further been found that the more compact the briquette (i. e., the higher the density thereof) the higher will be the density of the finally fired periclase.

In order to enable crystallization of the magnesia to take place at practical temperatures, such as those attainable in a rotary kiln, for example, up to about 1800° C., the practice in the prior art has been to admix with the magnesia, prior to firing, from 5 to 15% of impurities, including silica, lime, alumina and iron oxide. These impurities flux with the magnesia, enabling sintering and crystallization to take place at temperatures of from about 1550° C. to 1800° C. The usual procedure involves admixing these impurities with the magnesia in an aqueous suspension, filtering and drying the slurry, briquetting the dried and crushed filter cake and then firing the briquettes in a rotary or shaft kiln. This general procedure is also used in the practice of the instant invention, with the exception that the firing temperatures used may actually be as low as about 1000° C. and extremely good results are obtained using firing temperatures of about 1300–1350° C. Higher temperatures, up to about 1800° C. which is the maximum for such kilns, may be used, but it is of particular advantage in the instant invention to employ lower temperatures in the neighborhood of 1300° C. in order to obtain the superior results herein described.

In demonstrating the procedure of the instant invention, it will be appreciated that any magnesium compound which will form, or yield, periclase upon firing may be used. Such material is densified in the instant process to produce non-fused high-purity periclase, which is crystalline magnesium oxide. The material employed is in finely divided condition and examples of such materials include magnesium hydroxide, magnesium carbonate, magnesium basic carbonate, magnesium alcoholate, magnesium sulfate, magnesium chloride, etc. Natural magnesite or brucite is also usable. Often it is advantageous to employ a precipitated magnesium compound such as magnesium hydroxide, magnesium carbonate or basic carbonate and cryptocrystalline magnesia, since such precipitated compounds are in suitably finely divided condition. Cryptocrystalline magnesia may be obtained, for example, by firing magnesium carbonate, basic carbonate, or hydroxide at slightly lower than the firing temperatures used herein (up to about 1200° C.) so as to obtain what is often referred to in the art as amorphous or active magnesia and which is crystalline in form even though the magnesia crystals are too small to be observed under the microscope. The magnesia or periclase obtained upon firing any of these starting materials preferably contains at least 95% magnesium oxide and less than 2% calcium oxide and less than 2% silicon dioxide; and the starting materials also contain approximately these proportions of ingredients, with the exception of volatile components (as in the case of the carbonate) which are lost during firing. Preferably the magnesium compound is sufficiently finely divided to pass through a 100 mesh screen, and most preferably a 200 mesh screen.

The lithium compound which may be used has been described to some extent hereinbefore; and it will be appreciated that the instant invention does not preclude the use of the lithium compound with certain other so-called "catalysts," which do not apparently possess the truly catalytic properties of the lithium compound in this reaction, but which do function to lower the firing temperatures. Such compounds include chromium compounds (as mentioned in U. S. Patent No. 2,487,290), aluminum compounds (as mentioned in U. S. Patent No. 2,641,529) and iron compounds (as mentioned in U. S. Patent No. 2,641,530). In general, the best results are obtained using a lithium compound alone, in the absence of any of such other "catalysts," although good results may be obtained using lithium compounds which also contain, for example, iron, chromium or aluminum (e. g. lithium ferrite, LiFeO₂, lithium chromate, and lithium aluminate). With the possible exception of lithium ferrite, however, distinctly superior results are obtained in the practice of the instant invention using lithium compounds which do not contain any other metallic atoms or ions, or lithium compounds which are lithium salts of non-metallic anions. Such lithium compounds include lithium fluoride, lithium chloride, lithium bromide, lithium iodide, lithium sulfate, lithium carbonate, lithium nitrate, etc., and mixtures of such compounds. It should further be pointed out that sodium and potassium compounds corresponding to the instant lithium compounds appear to possess none of the unique catalyzing properties of the lithium compounds and, in fact, it appears that a typical member of this group, such as sodium fluoride, is even less effective than no catalyst at all at the firing temperatures here used. This would appear to be explained by the very substantial differences in ionic sizes between lithium and sodium or potassium compared to the similarity in ionic size between lithium and magnesium. The lithium compounds used in the practice of the invention may be intimately admixed with the magnesium compound in finely divided state (preferably both compounds being sufficiently fine to pass through a 200 mesh screen, and at least a 100 mesh screen). However, the best results are obtained depositing the lithium compound from solution or suspension onto the magnesium compound.

The instant invention may be demonstrated by carrying out a series of runs wherein a lithium compound is ball milled (or electrically stirred) with a slurry prepared by mixing one part of reagent grade magnesia with 2.5 parts of water. Preferably, the slurry is then partially dried at 120° C. and then further dried at 500 to 600° C., and the resulting cake is crushed to a fine size and then compressed into pellets or briquettes at about 4,500 pounds per square inch pressure. The pellets are then fired in a gas-heated furnace at a rate so as to heat the pellets from room temperature to about 1300° C. in approximately 1 hour, followed by cooling in the furnace to below 1000° C. in about ¼ hour. This is substantially the commercial firing schedule used in an industrial kiln. The bulk densities were measured at different temperatures; and the results obtained are indicated in the table I below (the theoretical maximum density of MgO, as determined by X-ray diffraction methods, being 3.58):

*Table I*

| Run | Additive to MgO Slurry | Amount Equiv. Percent of Li | Density Unfired (pressed) | Density 1,090° C. | Density 1,320° C. |
|---|---|---|---|---|---|
| (1) | LiF | 1.0 | 1.70 | 2.70 | 3.12 |
| (2) | LiCl | 1.0 | 2.04 | 2.80 | 3.40 |
| (3) | LiF-LiCl | 1.0 and 1.0 | 2.04 | 3.03 | 3.46 |
| (4) | LiBr | 1.0 | 2.11 | | 3.46 |
| (5) | LiI | 1.0 | 1.59 | | 3.23 |
| (6) | Li₂SO₄ | 1.0 | 1.58 | | 3.10 |
| (7) | Li₂CO₃ | 1.0 | 1.74 | | 2.94 |
| (8) | LiNO₃ | 1.3 | | | 3.19 |
| (9) | LiF-LiI | 0.5 and 0.5 | 1.50 | | 2.96 |
| (10) | LiF-LiCl | 0.5 and 0.5 | 1.82 | | 3.08 |
| (11) | None | None | 1.49 | | 2.23 |
| (12) | NaF | 1.0 (Na) | | | 2.16 |

It will be noted that the lithium halides show distinctly superior results, and particularly lithium chloride and lithium bromide which show the superior density obtained as a result of compacting or pressing the briquette as well as the superior density ultimately resulting after firing of the briquette. Lithium iodide is no doubt lost to an appreciable extent through decomposition and this result is probably not as good as it should be. Because of the insolubility of lithium fluoride, it will be appreciated that it is precipitated from a lithium chloride solution by the addition of ammonium fluoride; and this procedure (although practical) probably does not indicate fully the ability of lithium fluoride to function in this reaction. A comparison of runs (3) and (10) indicates that the more lithium added the better the result (although this is not clearly the case in connection with the use of lithium chloride alone, as will be demonstrated hereinafter). The density of pellets heated to 1090° C. in the case of runs (1), (2) and (3) indicates clearly that densification starts taking place at approximately 1000° C. to a very appreciable extent. Also, a comparison of runs (2) and (3) serves to bring out the fact that lithium fluoride is unique in that it accelerates the densification at lower temperatures than do most of the other lithium compounds. A theoretical explanation for this is that the size of the lithium fluoride molecule is substantially the same as the size of the magnesium oxide molecule. The general effectiveness of the instant lithium compounds as compared to the control run, run (11), shows clearly their superiority. Also, run (12), using sodium fluoride, shows clearly the difference in function between sodium and lithium compounds in this reaction.

Using ferric chloride in a procedure that is the same as that just described (using 1 weight percent on a ferric oxide basis) it will be noted that the density of pellets fired to 1320° C. is only 2.74. However, using 0.4 equivalent percent of lithium ferrite (prepared using LiNO₃ and FeCl₃ to yield LiFeO₂ or Li₂O.Fe₂O₃), it is found that the density of pellets fired to 1320° C. is 3.08.

Comparisons can also be made between dry mixing operations and the aforementioned deposition procedure in an aqueous slurry of magnesia. It should also be understood that solvents other than water can be used for deposition of lithium compounds on magnesia, but from a commercial point of view, water is the solvent or carrier of choice. Table II below indicates generally the results which may be obtained using either "dry" or "slurry" mixing conditions. In each case, heating to 600° C. after admixture of the magnesia and the lithium compound has been completed is used to obtain substantially uniform dryness in the corresponding samples; and in the practice of the instant invention, drying prior to pressing or briquetting should be carried out by heating to at least about 500 to 600° C.

*Table II*

| Run | Additive 1.0 Equiv. Percent | Mixing | Density Unfired | Density 1,200° C. |
|---|---|---|---|---|
| (13) | LiCl | dry | 2.10 | 2.64 |
| (14) | LiCl | slurry | 2.25 | 2.69 |
| (15) | LiF | dry | 2.00 | 3.20 |
| (16) | LiF | slurry | 1.71 | 2.87 |
| (17) | LiFeO₂ | dry | 2.04 | 2.54 |
| (18) | LiNO₃ and FeCl₃ | slurry | 2.15 | 2.56 |
| (19) | None | do | 2.06 | 2.24 |

It will be noted from runs (15) and (16) that the lithium fluoride is more effective than the other lithium compounds at the slightly lower firing temperature of 1200° C., and also that lithium fluoride functions better in dry mixing than in slurry mixing. A binder was used in the pressing operation here involved so the density of the unfired pellets is not always consistent with the results indicated in Table I.

The lithium compounds here used are apparently capable of entering into the magnesia crystal lattice and the resulting densified magnesia contains the lithium compound which is retained therein in solid solution. A particular advantage of the lithium halides, however, is that these compounds have boiling points at approximately the firing temperatures here used. The initial mechanism, as far as it can be understood, appears to involve melting of the lithium compound during the firing cycle and before maximum firing temperatures are obtained. This permits the lithium compound, and particularly the lithium halides to enter freely into the magnesia crystal structure and thus catalyze the densification process. By the time the maximum firing temperature is reached, the lithium compound will be found to have disappeared substantially. This leaves a magnesia or periclase which may contain chemically detectable amounts or traces of the lithium compound but which apparently has surfaces free from the lithium compound originally deposited thereon. In fact, certain features of the periclase obtained in the practice of the instant invention indicate unique surface characteristics as well as chemical properties. For example, the resistance to hydration of electrically fused magnesia is the same as or not quite as good as that obtained in magnesia or periclase prepared in accordance with the teachings of the instant invention and pure periclase fired at 1650° C. is only half as resistant. This gives an added advantage to the preparation of lower density periclases (in the range of 2.4 to 3.0) by the use of the invention, which in each case may be prepared by firing at temperatures appreciably lower than could be used in the absence of the lithium compound.

The disappearance of the lithium compound by penetration into the magnesia structure can be explained on the basis of the ionic sizes and other theoretical considerations hereinbefore set forth. However, in the case of the lithium halides (such as LiF and, particularly, LiCl and LiBr), it is believed that the disappearance of the lithium compounds may take place also through volatilization just as the firing temperature is reached; and this may account for the distinctly superior results obtained using such halides. In particular, it will be noted that the boiling points of the halides are 1265° C. for LiBr, 1353° C. for LiCl and 1676° C. for LiF (and LiI is substantially lower in a closed system, but in air decomposition would take place first). The disappearance of the lithium halides during the instant firing operation thus appears to be a real disappearance through volatilization, particularly in the case of lithium chloride and lithium bromide, so that only trace proportions of the lithium compound actually remain in the magnesia (although whatever lithium compound remains in the magnesia, such lithium compound is in solid solution therewith). For example, spectrographic analysis reveals that MgO containing 0.081% Li (occurring as 0.5% LiCl) contained only 0.01% Li (which amounts to 0.062% LiCl) after firing to 1300° C. over a one hour period, thus indicating a reduction in Li content to 0.12 of the original amount.

It appears that certain mechanisms closely associated with or forming a part of fusion are involved with respect to the migration of the lithium compounds and the consequent activation of the magnesia surface during firing. This latter feature makes possible the use of the invention in providing a binder for use in brickmaking, even though true and complete fusion does not take place.

Runs comparing lithium compound concentration to firing temperature and to pressure applied during pellet formation prior to firing were made using the slurry mixing procedure described in connection with run (2) herein (LiCl), and the results are as follows:

| Run | Firing Temp., ° C. | Concentration of LiCl, Wt. Percent | Fired Density of Pellets Pressed at 4,500 p. s. i. | Fired Density of Pellets Pressed at 18,000 p. s. i. |
|---|---|---|---|---|
| (20) | 1,300 | 0 | 2.16 | 2.83 |
| (21) | 1,300 | 0.1 | 2.26 | 3.06 |
| (22) | 1,300 | 0.25 | 3.31 | 3.32 |
| (23) | 1,300 | 0.5 | 3.30 | 3.43 |
| (24) | 1,300 | 0.75 | 3.38 | 3.35 |
| (25) | 1,300 | 1.0 |  | 3.30 |
| (26) | 1,300 | 1.5 |  | 3.33 |
| (27) | 1,400 | 0 | 2.45 | 2.97 |
| (28) | 1,400 | 0.1 | 3.00 | 3.18 |
| (29) | 1,400 | 0.25 | 3.36 | 3.44 |
| (30) | 1,400 | 0.5 | 3.40 | 3.46 |
| (31) | 1,400 | 0.75 | 3.42 | 3.46 |
| (32) | 1,400 | 1.0 |  | 3.34 |
| (33) | 1,400 | 1.5 |  | 3.37 |
| (34) | 1,200 | 0 |  | 2.50 |
| (35) | 1,200 | 0.1 |  | 2.69 |
| (36) | 1,200 | 0.5 |  | 2.81 |
| (37) | 1,200 | 1.0 |  | 2.78 |

Runs comparing lithium compound concentration to firing temperature for resistance to water absorption were made, using LiCl, pressing of pellets at 4500 p. s. i. and absorption test conditions of 150 p. s. i. steam for 2 hours; and the results are as follows:

| Run | Firing Temperature | Concentration of LiCl (Wt. Percent) | Water Content of Hydrated MgO in Wt. Percent |
|---|---|---|---|
| (38) | 1,300 | 0 | 31.2 |
| (39) | 1,300 | 0.1 | 30.9 |
| (40) | 1,300 | 0.25 | 9.8 |
| (41) | 1,300 | 0.5 | 5.1 |
| (42) | 1,300 | 0.75 | 11.0 |
| (43) | 1,400 | 0 | 31.3 |
| (44) | 1,400 | 0.1 | 30.5 |
| (45) | 1,400 | 0.25 | 15.0 |
| (46) | 1,400 | 0.5 | 3.7 |
| (47) | 1,400 | 0.75 | 10.4 |

It will be noted that by selection of the most preferred concentration of the lithium compound, which is 0.5 weight percent (and substantially the identical equivalent percent in this case) for lithium chloride, it is possible to obtain greater resistance to water absorption than that possessed by electrically fused magnesia. It will be noted that in run (48) the result obtained is 3.9% water absorbed, whereas controls using electrically fused magnesia could not give results below about 5.8% water absorbed in the same test.

Another aspect of the instant invention resides in the use of the invention in the manufacture of bricks or similar refractory ceramic materials. As is well known in the brickmaking art the filler or grog, which is substantially infusible at the brick firing temperature, is intimately admixed in the form of fine particles with a material that is at least partially "fusible" (or undergoes integration of a nature similar to fusion) at the firing temperature, and this material is known as the binder. In ordinary brickmaking the binder used is usually a brickmaking clay. In the practice of the instant invention, highly refractory bricks may be obtained using periclase which has been densified by any of the prior art processes, but preferably by the instant densification method. Such periclase is ground up into relatively fine particle size suitable for brickmaking and this may be used as the entire or a substantial proportion of the grog component.

In the practice of the instant invention, the binder used is the hereinbefore described admixture of undensified magnesia and the lithium compound. As an example, 50 parts of densified periclase grog and 50 parts of magnesia which has had one equivalent percent of lithium chloride applied thereto in a slurry and has been subsequently dried, are admixed and compacted under pressure at 4500 pounds per square inch to form an integrated unfired brick. The brick is then fired on a rapid schedule to 1350° C. (i. e. about 1 hour heating) so as to obtain a highly refractory "all periclase" brick.

It will be appreciated that there are particular advantages in employing substantially all periclase in the grog and substantially all magnesium compound-lithium compound mixture as the binder in the instant brickmaking procedure, although substitutions can be made for part of the grog and/or part of the binder. The firing temperatures employed are the same as those hereinbefore described for the densification of magnesia in accordance with the teachings of the instant invention. The amount of grog may range from about 30–60%, with the remainder binder.

It will be understood that modifications and variations may be effected without departing from the scope of the novel concepts of the present invention.

I claim as my invention:

1. A process for densifying magnesia, which comprises intimately admixing a finely divided magnesium compound which yields periclase upon firing and a lithium compound, said lithium compound being added in an amount sufficient to provide 0.01 to 5 equivalent percent of the lithium compound in the mixture on a dry basis, and firing said mixture at a temperature of at least 1000° C. to form high-purity periclase.

2. A process for densifying magnesia, which comprises intimately admixing a finely divided magnesium compound which yields periclase upon firing and a lithium halide, said lithium halide being added in an amount sufficient to provide 0.01 to 5 equivalent percent of the lithium compound in the mixture at a temperature of at least 1000° C. on a dry basis, and firing said mixture to form high-purity periclase.

3. A process for densifying magnesia, which comprises intimately admixing a finely divided magnesium compound which yields periclase upon firing and a lithium compound that is a salt of lithium and a polarizable anion, said lithium compound being added in an amount sufficient to provide 0.01 to 5 equivalent percent of the lithium compound in the mixture at a temperature of at least 1300° C. on a dry basis, and firing said mixture to form high-purity periclase.

4. A process for densifying magnesia, which comprises intimately admixing a finely divided magnesium compound which yields periclase upon firing and a lithium compound, said lithium compound being added in an amount sufficient to provide 0.05 to 1.5 equivalent percent of the lithium compound in the mixture on a dry basis, and firing said mixture at a temperature of at least 1300° C. to form high-purity periclase.

5. A process for densifying magnesia, which comprises intimately admixing a finely divided magnesium compound which yields periclase upon firing and lithium chloride, said lithium chloride being added in an amount sufficient to provide 0.05 to 1.5 equivalent percent of the lithium compound in the mixture at a temperature of at least 1300° C. on a dry basis, and firing said mixture to form high-purity periclase.

6. A process for densifying magnesia, which comprises intimately admixing a finely divided magnesium compound which yields periclase upon firing and lithium fluoride, said lithium fluoride being added in an amount sufficient to provide 0.05 to 1.5 equivalent percent of the lithium compound in the mixture on a dry basis, and firing said mixture at a temperature of at least 1300° C. to form high-purity periclase.

7. A process for densifying magnesia, which comprises intimately admixing a finely divided magnesium compound which yields periclase upon firing and a lithium compound to coat the surface of the finely divided magnesium compound, said lithium compound being added in an amount sufficient to provide 0.01 to 5 equivalent percent of the lithium compound in the mixture on a dry basis, compacting the mixture at a temperature of at least 1300° C. to increase the density, and firing said mixture to form high-purity periclase.

8. A process for densifying magnesia, which comprises depositing from solution a lithium compound onto a finely divided magnesium compound which yields periclase upon firing, said lithium compound being deposited in an amount sufficient to provide 0.01 to 5 equivalent percent of the lithium compound in the resulting lithium and magnesium compound mixture at a temperature of at least 1300° C. on a dry basis, and firing said mixture to form high-purity periclase.

9. A process for densifying magnesia, which comprises precipitating from aqueous solution a lithium compound onto a finely divided magnesium compound which yields periclase upon firing, said lithium compound being deposited in an amount sufficient to provide 0.01 to 5 equivalent percent of the lithium compound in the resulting lithium and magnesium compound mixture at a temperature of at least 1300° C. on a dry basis, and firing said mixture to form high-purity periclase.

10. A process for densifying magnesia, which comprises applying an aqueous solution of a lithium compound onto a finely divided magnesium compound which yields periclase upon firing, said lithium compound being deposited in an amount sufficient to provide 0.01 to 5 equivalent percent of the lithium compound in the resulting lithium and magnesium compound mixture on a dry basis, heating to remove the water and deposit the lithium compound, and firing said mixture at a temperature of at least 1300° C. to form high-purity periclase.

11. A process for densifying magnesia, which comprises depositing from solution a lithium compound onto a finely divided magnesium compound which yields periclase upon firing, said lithium compound being a salt of lithium and a polarizable anion and being deposited in an amount sufficient to provide 0.01 to 5 equivalent percent of the lithium compound in the resulting lithium and magnesium compound mixture on a dry basis, compacting the resulting mixture, and firing said mixture at a temperature of at least 1300° C. to form high-purity periclase.

12. A process for densifying magnesia, which comprises applying an aqueous solution of a lithium halide to a finely divided magnesium compound which yields periclase upon firing, said lithium halide being deposited in an amount sufficient to provide 0.01 to 5 equivalent percent of the lithium compound in the resulting lithium and magnesium compound mixture on a dry basis, drying and compacting the resulting mixture, and firing said mixture at a temperature of at least 1000° C. to form high-purity periclase.

13. A process for densifying magnesia, which comprises applying an aqueous solution of lithium chloride a finely divided magnesium compound which yields periclase upon firing, said lithium chloride being deposited in an amount sufficient to provide 0.01 to 5 equivalent percent of the lithium compound in the resulting lithium and magnesium compound mixture on a dry basis, drying and compacting the resulting mixture, and firing said mixture at a temperature of at least 1300° C. to form high purity periclase.

14. A process for densifying magnesia, which comprises precipitating from aqueous solution lithium fluoride onto a finely divided magnesium compound which yields periclase upon firing, said lithium fluoride being deposited in an amount sufficient to provide 0.01 to 5 equivalent percent of the lithium compound in the resulting lithium and magnesium compound mixture on a dry basis, and firing said mixture at a temperature of at least 1300° C. to form high purity periclase.

15. Densified non-fused high purity periclase consisting essentially of at least 95% MgO, from a trace to 2% CaO, from a trace to 2% $SiO_2$ and less than 1% of a lithium compound in solid solution in the MgO, said periclase having a density of 2.4 to 3.5 and being more resistant to hydration than electrically fused high-purity periclase.

16. A brickmaking process which comprises shaping a body formed of a mixture of (a) densified periclase grog and (b) a binder that is an admixture of a magnesium compound which yield periclase upon firing and a lithium compound, said lithium compound being added in an amount sufficient to provide 0.01 to 5 equivalent percent of the lithium compound in the admixture on a dry basis; and firing the body at a temperature of at least 1000° C. to convert the binder to periclase and integrate the body.

17. A brick comprising periclase grog and a binder that is densified high-purity periclase consisting essentially of 95% MgO, less than 2% CaO, less than 2% $SiO_2$ and from a trace to 1% of a lithium compound in solid solution in the MgO.

18. A process for densifying magnesia, which comprises firing, at a temperature of at least 1000° C. to form periclase, a magnesium compound which yields periclase upon firing in intimate contact with a lithium compound, the lithium compound content of the combination of magnesium and lithium compounds employed being 0.01 to 5 equivalent percent of the combination.

References Cited in the file of this patent

UNITED STATES PATENTS

| | | |
|---|---|---|
| 1,248,880 | McLaughlin | Dec. 4, 1917 |
| 2,281,477 | Chesny | Apr. 28, 1942 |
| 2,335,374 | Woodward | Nov. 30, 1943 |
| 2,571,101 | Austin | Oct. 16, 1951 |
| 2,641,530 | Austin | June 9, 1953 |
| 2,656,279 | Heuer | Oct. 20, 1953 |